US012374060B2

(12) United States Patent
Guerra de la Llera et al.

(10) Patent No.: US 12,374,060 B2
(45) Date of Patent: Jul. 29, 2025

(54) SYSTEM AND METHOD FOR DETECTING OBJECT COLLISIONS IN AUGMENTED REALITY IMAGES

(71) Applicant: Walmart Apollo, LLC, Bentonville, AR (US)

(72) Inventors: Arami Guerra de la Llera, Frisco, TX (US); Anisha Alahari, Arlington, VA (US); Daniel Hyunwoo Lee, Whittier, CA (US); Eugene Krivopaltsev, San Jose, CA (US); Sreeneel Maddika, San Ramon, CA (US); Vijay Saradhi Yellapragada, San Ramon, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 213 days.

(21) Appl. No.: 18/217,247

(22) Filed: Jun. 30, 2023

(65) Prior Publication Data
US 2025/0005870 A1     Jan. 2, 2025

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/016* (2013.01); *G06T 19/20* (2013.01); *G06V 10/25* (2022.01);
(Continued)

(58) Field of Classification Search
CPC ........ G06T 19/006; G06V 10/25; G06F 3/016
(Continued)

(56) References Cited

U.S. PATENT DOCUMENTS

| 7,277,572 B2 | 10/2007 | Macinnes et al. |
| 2018/0190027 A1* | 7/2018 | Yao ........................ G06T 19/006 |

(Continued)

FOREIGN PATENT DOCUMENTS

CN    108898676 A    5/2022

OTHER PUBLICATIONS

Hadikurniawati, W., et al., "A Bounding Box Collision Detection Method Based on the Android System for Adventure Game," WMA-Mathcontech 2018, IOP Conf. Series: Journal of Physics Conf. Series 1114 (2018) 0120999, doi:10.1088/1742-6596/1114/1/012099 2018.
(Continued)

*Primary Examiner* — Thomas J Lett
(74) *Attorney, Agent, or Firm* — Dickinson Wright PLLC; Hector A. Agdeppa

(57) ABSTRACT

A method can include capturing, in real-time via a camera, an image of a real environment. The method further can include determining, using the image, a primary plane in the real environment. The method additionally can include rendering, in real-time on a display device for a user, a virtual object in the image of the real environment. The method also can include detecting a collision by the virtual object in the image, comprising: (a) projecting the virtual object onto the primary plane as a 2D resting plane for the virtual object; (b) determining tracking rays for the virtual object, wherein the tracking rays connect vertices of the 2D resting plane to a viewpoint from the camera; and (c) determining the collision based on whether the tracking rays intersect with a plane of one or more existing physical objects in the image. The method further can include upon determining that the collision is detected, outputting a haptic effect indicating the collision. Other embodiments are disclosed.

20 Claims, 8 Drawing Sheets

(51) Int. Cl.
  *G06T 19/20*  (2011.01)
  *G06V 10/25*  (2022.01)
(52) U.S. Cl.
  CPC .. *G06T 2210/21* (2013.01); *G06T 2219/2016* (2013.01)
(58) Field of Classification Search
  USPC .......................................................... 345/633
  See application file for complete search history.

(56) References Cited

U.S. PATENT DOCUMENTS

| | | | |
|---|---|---|---|
| 2018/0276891 A1* | 9/2018 | Craner | G08B 7/06 |
| 2020/0027276 A1 | 1/2020 | Meier et al. | |
| 2023/0296906 A1* | 9/2023 | Hsiao | G02B 27/026 |
| | | | 345/7 |

OTHER PUBLICATIONS

Cai, Z., Dill, J., and Payandeh, S., "Haptic Rendering: Practical Modeling and Collision Detection," IMECE99/DSCD, Proceedings of the ASME Virtual Environment and Teleoperator System symposium, Nashville, retrieved from https://www.researchgate.net/publication/246357326 Nov. 1999.

Lehericey, F., Gouranton, V., and Arnaldi, B., "Ray-Traced Collision Detection: Interpenetration Control and Multi-GPU Performance," Joint Virtual Reality Converence of EGVE—Euro VR. B. Mohler, B. Raffin, H. Saito, and O. Staadt (Editors) 2013.

\* cited by examiner

400

| 410 Obtaining an image of a real environment |

| 420 Determining, using the image, a primary plane in the real environment |

| 430 Receiving a selection of a virtual object by a user |

| 440 Rendering the virtual object in the image of the real environment |

450 Detecting a collision by the virtual object in the image
- 4510 Projecting the virtual object onto the primary plane as a 2D resting plane for the virtual object
- 4520 Determining tracking rays for the virtual object
- 4530 Determining the collision based on: (a) whether the tracking rays intersect with a plane of the existing physical object(s) in the image; and (b) whether the plane comprises a first alignment different than a second alignment of the virtual object
- 4540 Determining the collision based on whether the tracking rays extend outside a border of the primary plane
- 4550 Determining the collision based on whether the 2D resting plane intersects with a second 2D resting plane of the existing virtual object(s) in the image

| 460 Outputting a haptic effect indicating the collision, if detected |

FIG. 4

SYSTEM AND METHOD FOR DETECTING OBJECT COLLISIONS IN AUGMENTED REALITY IMAGES

TECHNICAL FIELD

This disclosure relates generally to techniques for detecting objection collisions in augmented reality images.

BACKGROUND

Augmented reality (AR) technologies are used for various applications for users to interact with the applications. Conventional AR applications require complex image processing techniques to simulate the interactions between virtual objects and/or physical objects in the real environment. However, not all applications require precise and accurate simulations of object interactions. For applications such as e-commerce, video games, e-learning platforms, etc., a rough simulation can be sufficient. Thus, systems and methods for using fewer computing resources under certain circumstances to achieve acceptable AR applications are desired.

BRIEF DESCRIPTION OF THE DRAWINGS

To facilitate further description of the embodiments, the following drawings are provided in which:

FIG. 4 illustrates a flow chart for a method for detecting object collisions in an AR image, according to an embodiment;

Figure 1:
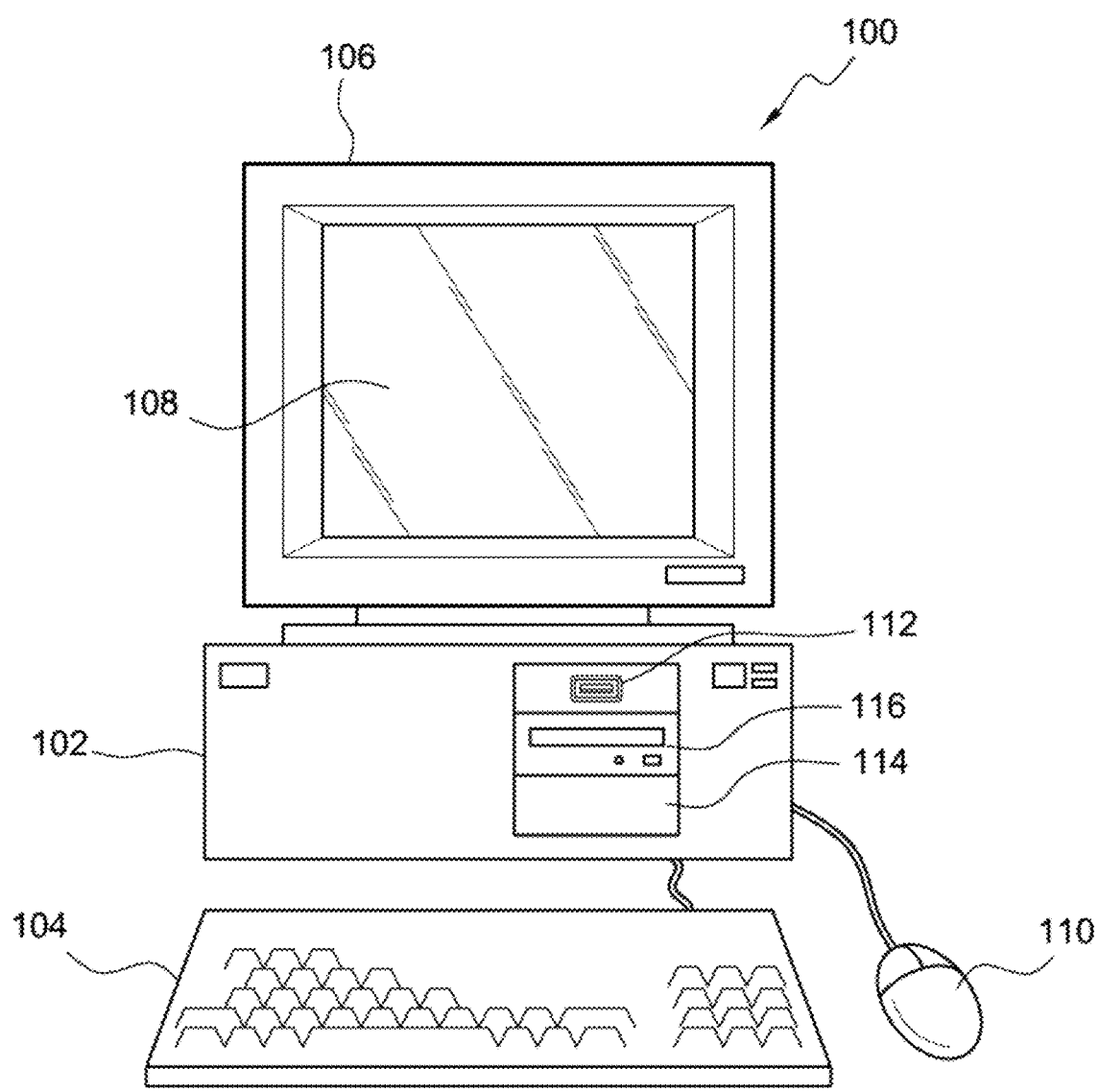
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

DESCRIPTION OF EXAMPLES OF EMBODIMENTS

Figure 2:
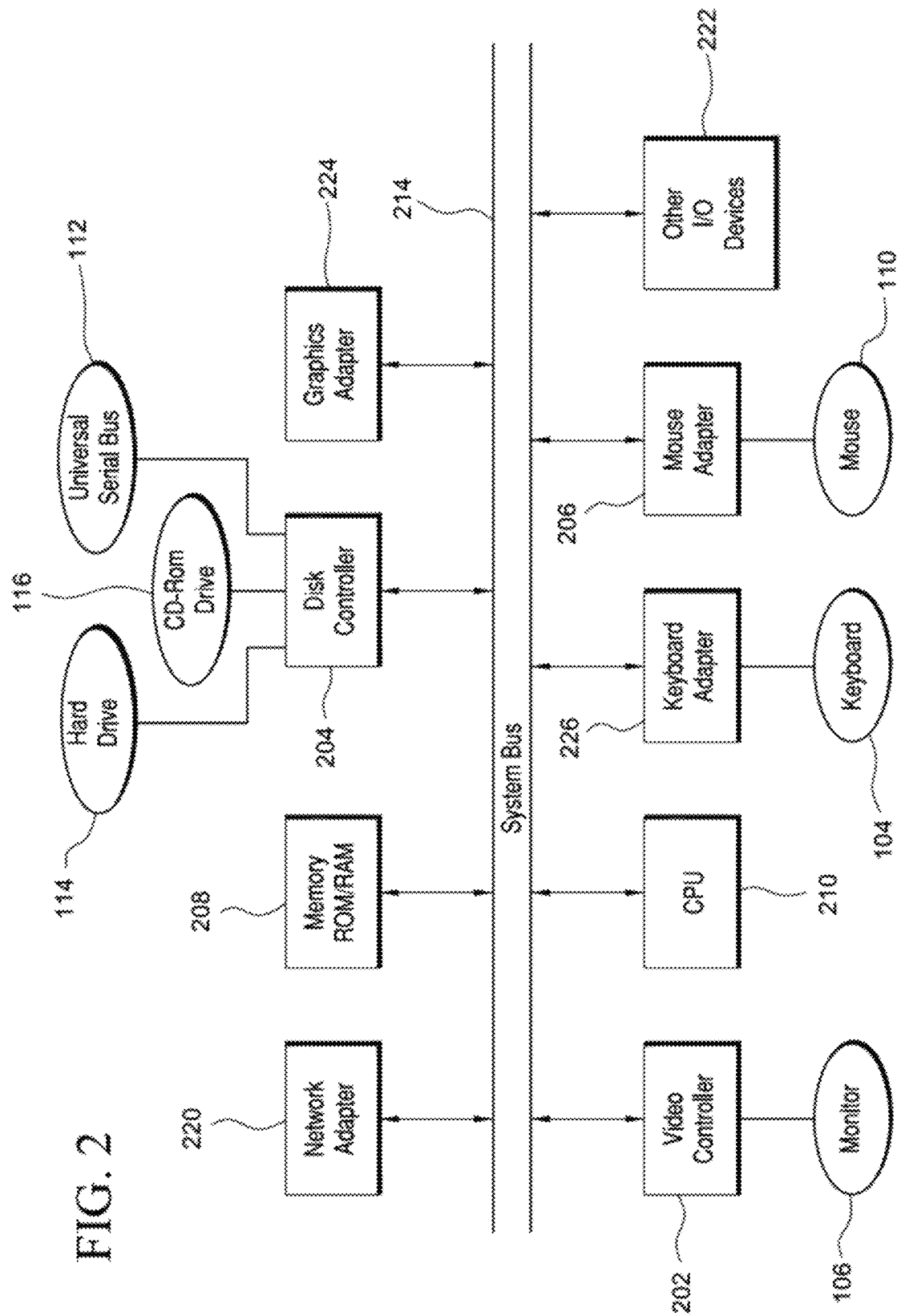
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refers to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICS.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
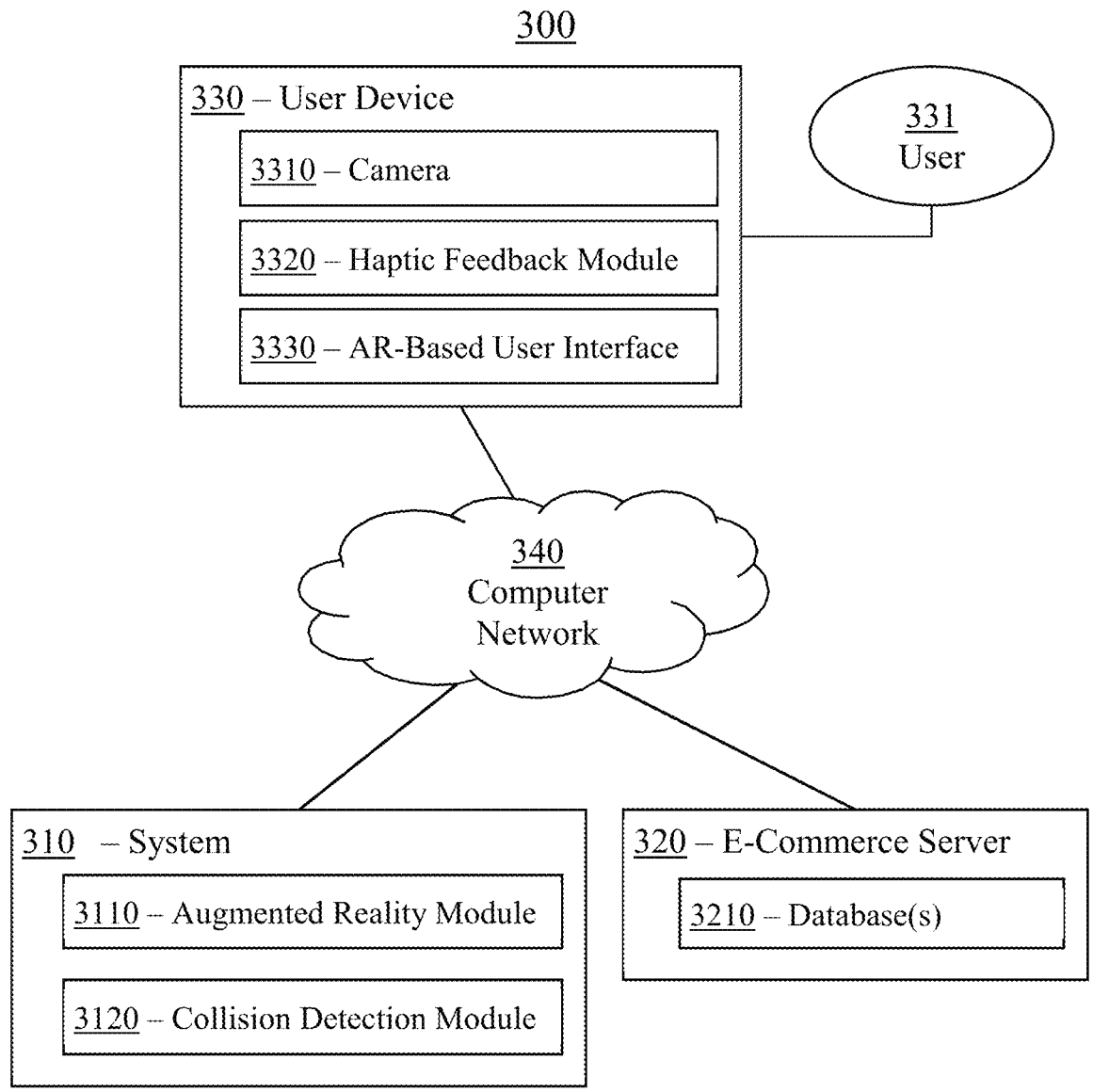
FIG. 3 illustrates a system for detecting object collisions in an augmented reality (AR) image, according to an embodiment.

Turning ahead in the drawings, FIG. 3 illustrates a block diagram for a system 300, according to an embodiment. In many embodiments, system 300 comprises one or more systems (e.g., a system 310), one or more computer networks (e.g., a computer network 340), one or more servers (e.g., an e-commerce server 320), and/or one or more user devices (e.g., a user device 330) for one or more users (e.g., a user 331). In many embodiments, user 331 is not part of system 300. In many embodiments, system 300 or system 310 can allow the control or manipulation (e.g., adding, removing, placing, moving, rotating, etc.) of virtual objects in an augmented reality (AR) image of a real environment by a user (e.g., user 331), via a user interface (e.g., an AR-based user interface 3330) executed on user device 330, and detect any collisions by a virtual object with other virtual objects and/or any physical objects in the AR image caused by the user's control of the virtual object.

For example, system 300 or system 310 can allow a user (e.g., user 331) to select, via user device 330, an item (e.g., a chair or a charcoal grill) from a product listing at an online retailer's website (e.g., e-commerce server 320) to be shown, on AR-based user interface 3330, in an AR image of the user's patio. In another example, system 300 or system 310 can allow user 331 to create a virtual object (e.g., an 3-dimensional (3D) geometric object, an avatar of user 331, a character, etc.) to play with, on AR-based user interface 3330 for a video game, in an AR image of a real environment (e.g., a classroom). The AR image can be generated, by system 310, augmented reality module 3110, and/or user device 330, based on: (a) a photograph or a frame of a video stream taken in real-time via a camera of user device 330 (e.g., a camera 3310), or (b) an image retrieved from a memory device of user device 330 or a remote storage (e.g., a cloud storage) via a computer network (e.g., computer network 340). System 300 or system 310 can be configured to allow user 331 to move and/or rotate the virtual object for the item in the AR image while providing a realistic user experience by detecting, in real-time, whether a collision has occurred due to the movement and/or rotation of the virtual object. System 300 or system 310 further can provide the realistic user experience by causing user device 330 to provide a haptic feedback (e.g., vibrations) via a haptic feedback module (e.g., a haptic feedback module 3320) when a collision is detected.

Systems 300 and 310 are merely exemplary, and embodiments of systems 300 and 310 are not limited to the embodiments presented herein. Systems 300 and 310 can be employed in many different embodiments or examples not specifically depicted or described herein. In many embodiments, systems 300 and 310 can comprise one or more suitable systems, subsystems, servers, modules, elements, and/or models. In some embodiments, system 310 further can include an augmented reality module 3110 and/or a collision detection module 3120. In some embodiments, certain elements, modules, servers, or systems of systems 300 and 310 can perform various procedures, processes, and/or activities. In other embodiments, the procedures, processes, and/or activities can be performed by other suitable elements, modules, servers, or systems of systems 300 and 310. Systems 300 and 310 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of systems 300 and 310 described herein.

In many embodiments, system 310, augmented reality module 3110, collision detection module 3120, e-commerce server 320, and/or user device 330 can each be a computer system, such as computer system 100 (FIG. 1), as described above, and can each be a single computer, a single server, or a cluster or collection of computers or servers, or a cloud of computers or servers. In other embodiments, a single computer system can host one or more of system 310, augmented reality module 3110, collision detection module 3120, e-commerce server 320, and/or user device 330. Additional details regarding system 310, augmented reality module 3110, collision detection module 3120, e-commerce server 320, and/or user device 330 are described herein.

In some embodiments, system 310, augmented reality module 3110, collision detection module 3120, e-commerce server 320, user device 330, and/or AR-based user interface 3330 can be modules of computing instructions (e.g., software modules) stored at non-transitory computer readable media that operate on one or more processors. In a few embodiments, system 300 and/or system 310 does not include one or more of augmented reality module 3110, collision detection module 3120, e-commerce server 320, and/or user device 330. In certain embodiments, user device does not include one or more of camera 3310, haptic feedback module 3320, and/or AR-based user interface 3330. As an example, camera 3310 or haptic feedback module 3320 can be provided by or with user device 330, and in other embodiments, camera 3310 or haptic feedback module 3320 can be added to user device 330 via a connector (e.g., USB port 112 (FIGS. 1-2)). As an additional example, AR-based user interface 3330 can be provided by or with user device 330, and in other embodiments, AR-based user interface 3330 can be added to user device 330 via an app store, where an entity operating or controlling one or more of system 310, augmented reality module 3110, collision detection module 3120, or e-commerce server 320 creates and uploads (or otherwise provides) AR-based user interface 3330 to the app store (whether through a single app or more than one app).

In these or other embodiments, system 310, augmented reality module 3110, collision detection module 3120, e-commerce server 320, user device 330, and/or each of their respective elements, modules, and/or models can be implemented in hardware or combination of hardware and software. In many embodiments, the operator and/or administrator of system 310, augmented reality module 3110, and/or collision detection module 3120 can manage system 310, augmented reality module 3110, collision detection module 3120, and/or their respective processor(s) and/or memory storage unit(s) using the respective input device(s) and/or display device(s).

In a number of embodiments, system 310 can include one or more input devices (e.g., one or more keyboards, one or more keypads, one or more pointing devices such as a computer mouse or computer mice, one or more touchscreen displays, a microphone, etc.), and/or can comprise one or more display devices (e.g., one or more monitors, one or more touchscreen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 310 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 310. In a similar manner, the processors and/or the non-transitory computer-readable media can be local and/or remote to each other.

System 300, system 310, e-commerce server 320, and/or user device 330 can be implemented using any suitable manner of wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, system 310 can be in data communication, directly or through computer network 340, with e-commerce server 320 and/or user device 330. User device 330 also can be in data communication, directly or through computer network 340, with e-commerce server 320. Computer network 340 can include one or more of a computer network, a telephone network, the Internet, and/or an internal network not open to the public (e.g., a private network and/or a virtual private network (VPN)), etc.

Meanwhile, in many embodiments, system 310 and/or e-commerce server 320 also can be configured to communicate with one or more databases (e.g., database(s) 3210). Examples of the one or more databases can include a cloud storage for storing photographs, a database for storing user profiles for the e-commerce server 320, and/or a database that contains information about products, items, SKUs (stock keeping units), inventory, and/or online orders, for example, among other information. In some embodiments, for any particular database of the one or more databases (e.g., database(s) 3210), that particular database can be stored on a single memory storage unit or the contents of that particular database can be spread across multiple ones of the memory storage units storing the one or more databases, depending on the size of the particular database and/or the storage capacity of the memory storage units. Further, the one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, RocksDB, and IBM DB2 Database.

In many embodiments, e-commerce server 320 can host one or more websites and/or mobile application servers that interface, via a computer network (e.g., computer network 340), with a user device (e.g., user device 330). For example, e-commerce server 320 can allow one or more users (e.g., user 331) to browse, search, view, and/or order products or items stored in database(s) 3210.

In a number of embodiments, user device 330 can be used by one or more users (e.g., user 331) to interface with system 310 and/or e-commerce server 320. For example, user device 330 can transmit, via various user interfaces (e.g., AR-based user interface, webpages, applications, etc.), commands from user 331 to system 310 and/or e-commerce server 320, and receive responses and/or notices from system 310 and/or e-commerce server 320. In several embodiments, system 310 can include user device 330 and vice versa.

In many embodiments, system 310 and/or user device 330 can be configured to: (a) render an AR image featuring a virtual object in a real environment, (b) allow one or more users (e.g., user 331) to manipulate (e.g., move or rotate) the virtual object in the AR image, (c) detect a collision by the virtual object with one or more preexisting objects in the AR image, and/or (d) output, via haptic feedback module 3320 (e.g., an eccentric rotating mass (ERM) vibrator, a linear vibrator, etc.), a haptic effect indicating any collision detected. In some embodiments, system 310 and/or user device 330 further can allow user 331 to add more than one virtual objects in the AR image. Detect the collision by the virtual object with the one or more preexisting objects thus can include detecting collisions with one or more preexisting physical objects and/or virtual objects in the AR image.

For example, system 310 and/or user device 330 can allow a user (e.g., user 331) to virtually furnish an empty living room with multiple pieces of furniture from an online retailer (e.g., e-commerce server 320). In certain embodiments, user device 331 can: (a) receive, via AR-based user interface 3330 by user 331, a selection of an item (e.g., a desk, a chair, a bed, etc.) from e-commerce server 320; (b) take, via camera 3310, an image of a real environment (e.g., the living room); (c) transmit, directly or via computer network 340, an item image for the item, as selected, and the image of the real environment to system 310; (d) receive, directly or via computer network 340, an AR image generated based on the item image and the image of the real environment by system 310 and/or augmented reality module 3110, and display the AR image in real-time on AR-based user interface 3330; (e) transmit, directly or via computer network 340, a control command from user 311 to system 310 and/or collision detection module 3120; (f) receive, directly or via computer network 340 from system 310 and/or collision detection module 3120, a determination of whether a collision is detected; and/or (g) output, via haptic feedback module 3320, a haptic effect indicating the collision, if detected.

In certain embodiments, system 310 and/or user device 330 can be desktop computers, laptop computers, mobile devices, and/or other endpoint devices used by one or more users (e.g., user 331). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

Turning ahead in the drawings, FIG. 4 illustrates a flow chart for a method for detecting object collisions in an AR image, according to an embodiment. In many embodiments, method 400 can be implemented via execution of computing instructions on one or more processors. Method 400 is merely exemplary and is not limited to the embodiments presented herein. Method 400 can be employed in many different embodiments or examples not specifically depicted or described herein. In some embodiments, the procedures, the processes, the activities, and/or the blocks of method 400 can be performed in the order presented. In other embodiments, the procedures, the processes, the activities, and/or the blocks of method 400 can be performed in any suitable order. In still other embodiments, one or more of the procedures, the processes, the activities, and/or the blocks of method 400 can be combined or skipped.

In many embodiments, system 300 (FIG. 3), system 310 (FIG. 3), augmented reality module 3110 (FIG. 3), collision detection module 3120 (FIG. 3), user device 330 (FIG. 3), camera 3310 (FIG. 3), haptic feedback module 3320 (FIG. 3), and/or AR-based user interface 3330 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300 (FIG. 3), system 310 (FIG. 3), and/or user device 330 (FIG. 3). The processor(s) can be similar or identical to the processor(s) described above with respect to computer system 100 (FIG. 1).

In many embodiments, method 400 can include obtaining an image of a real environment (block 410). The image can be a photograph or a frame of a video recording taken by a user (e.g., user 331 (FIG. 3)) using a camera (e.g., camera 3310 (FIG. 3) or the camera of a mobile phone). The real environment can be, as an example, a physical space (e.g., an office, a bedroom, a backyard, a coffee shop, a street, etc.) in which the user is currently located. In some embodiments, block 410 can include capturing, in real-time via the camera, the image of the real environment. In similar or different embodiments, block 410 can include retrieving the image from a data storage, such as from a memory device of a user device (e.g., user device 330 (FIG. 3) or a mobile phone) or remotely (e.g., via computer network 340 (FIG. 3)) from a cloud storage, etc.

In a number of embodiments, method 400 further can include determining, using the image, a primary plane in the real environment (block 420). The primary plane can be the floor or a major support surface in the real environment. In many embodiments, block 420 can include determining horizontal planes and vertical planes in the image of the real environment. Block 420 can use any suitable 3D plane detection algorithms, models, or modules (e.g., Convolutional Neural Networks (CNN), Regional Convolutional Neural Networks (R-CNN), Feature Pyramid Network (FPN), Residual Network (ResNet), etc.) to detect the horizontal planes and vertical planes in the image.

In many embodiments, block 420 further can include determining a default orientation. The default orientation can be determined based on the orientation of the virtual object to be shown in the image (e.g., the selected item for a product listing from an online retailer (e.g., e-commerce server 320 (FIG. 3)), relative to the image. For example, when the default orientation of the virtual object for an item (e.g., a lamp) to be selected in block 430 is upright and the image taken in block 410 is in portrait mode, the primary plane can be one of the horizontal planes at the vertical side of the image. In a few embodiments, the default orientation can be predetermined to be horizontal or vertical. In certain embodiments, the default orientation can be determined based on a user setting received, via a user interface (e.g., AR-based user interface 3330 (FIG. 3)), from a user (e.g., user 331 (FIG. 3)).

In many embodiments, after determining the horizontal and vertical planes and the default orientation, block 420 additionally can include determining the primary plane based on the default orientation and a respective size of each of the horizontal planes and the vertical planes. For example, the primary plane in a portrait/vertical image can have the largest area among the horizontal planes detected. In several embodiments, block 420 further can disregard some of the planes detected. For example, when a first plane (e.g., an area rug or a painting) laid on top of a larger second plane (e.g., the primary plane or a wall) is detected (e.g., a distance between the first plane and the second plane being less than a threshold), block 420 can either ignore the first plane or merge it with the larger second plane.

In some embodiments, method 400 further can include receiving a selection of a virtual object by a user (block 430). Block 430 can be performed before, after, or concurrently with blocks 410 and/or 420. Further, block 430 can receive, via a computer network (e.g., computer network 340 (FIG. 3)), the selection by the user (e.g., user 331 (FIG. 3)) from a user interface (e.g., AR-based user interface 3330 (FIG. 3)). Examples of the virtual object can include a virtual object for a piece of furniture offered for sale on an online retailer's website (e.g., e-commerce server 320 (FIG. 3)), a virtual character for an AR video game, etc.

In many embodiments, method 400 further can include rendering the virtual object in the image of the real environment (block 440). Block 440 can include rendering, in real-time on a display device (e.g., a screen for user device 330 (FIG. 3)) for the user (e.g., user 331 (FIG. 3)), the virtual object in the image of the real environment. In some embodiments, block 440 further can include before rendering the virtual object, using a system (e.g., system 310 (FIG. 3) and/or augmented reality module 3110 (FIG. 3)) to modify the image obtained in block 410 to include the virtual object at a 3D location in the image and transmitting, via a computer network (e.g., computer network 340 (FIG. 3)), to the user device (e.g., user device 330 (FIG. 3)). The 3D location for the virtual object in the image can be a predetermined location (e.g., the center of the primary plane, the furthest end of the primary plane from the camera, etc.) in the image by default, and/or determined based on a user command by the user via a user interface (e.g., AR-based user interface 3330 (FIG. 3)).

Figure 5:
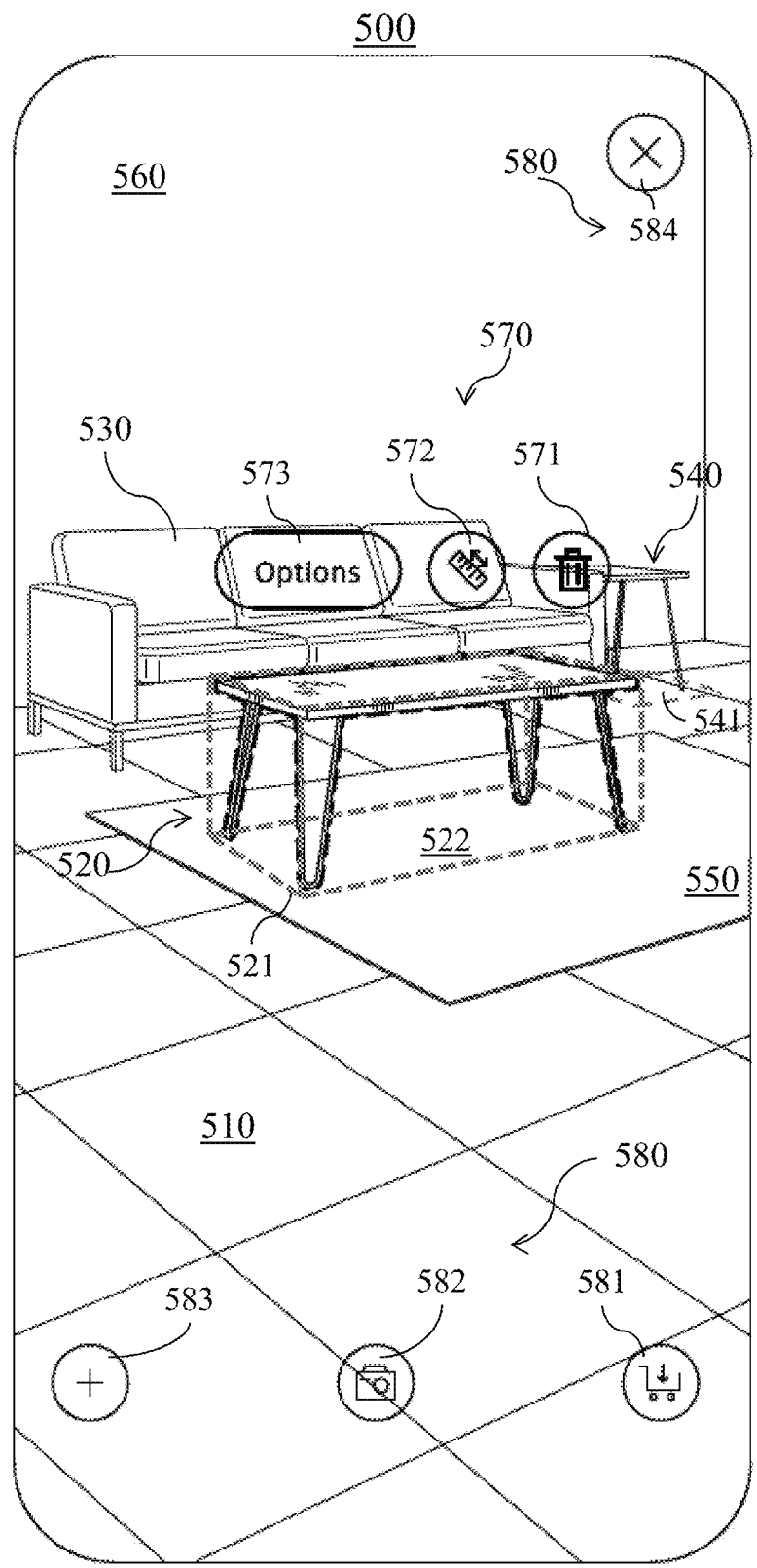
FIG. 5 illustrates an exemplary user interface for rendering an AR image in a method in FIG. 4, according to an embodiment.

Turning ahead in the drawings, FIG. 5 illustrates an exemplary AR-based user interface 500 for rendering one or more virtual objects in an image of a real environment in method 400 and/or block 440, according to an embodiment. Exemplary AR-based user interface 500 is merely exemplary and is not limited to the embodiments presented herein. In many embodiments, exemplary AR-based user interface 500 can: (a) display the image of a real-environment (e.g., a living room), as originally captured in block 410, with one or more preexisting physical objects (e.g., a floor 510, a couch 530, a rug 550, and/or a wall 560) in the real environment; and (b) allow a user (e.g., user 331 (FIG. 3)) to place a virtual object (e.g., a virtual table 520), selected in block 430, on the primary plane (e.g., floor 510 and rug 550), as determined in block 420. In a number of embodiments, exemplary AR-based user interface 500 further can display more than one virtual objects. For example, after blocks 410 and 420, blocks 430 and 440 can be repeated for the user to add multiple virtual objects to the image, and thus before virtual table 520 is selected in block 420, the image displayed on exemplary AR-based user interface 500 can already include one or more preexisting virtual objects (e.g., a virtual end table 540).

In a number of embodiments, exemplary AR-based user interface 500 further can include one or more icons for receiving user commands. The one or more icons can include one or more app-level icons (e.g., app-level icons 580) and/or one or more object-level icons (e.g., object-level icons 570). App-level icons 580 can include, for example, an add-to-cart icon 581 for adding the item for the virtual object (e.g., table 520) to a shopping cart, an image icon 582 for choosing an photograph from a memory device or a remote storage, an add-object icon 583 for adding another virtual object to the image, and/or a close icon 584 for closing the AR-based user interface 500, etc. In certain embodiments, object-level icons 570 can include a delete icon 571 for removing virtual table 520 from the image, a measurement icon 572 for showing the measurements (e.g., a length, width, and/or height) of virtual table 520, an options icon 573 for additional miscellaneous commands associated with virtual table 520 (e.g., changing the color or style for virtual table 520, etc.), and so forth.

Referring back to FIG. 4, in many embodiments, method 400 further can include detecting a collision by the virtual object in the image (block 450). The timing of when a collision can happen can include, as an example, when the virtual object is automatically placed at the default location in block 440 or after the user controls (e.g., places, moves, or rotates) the virtual object in the image. In many embodiments, block 450 further can include projecting the virtual object onto the primary plane as a 2-dimensional (2D) resting plane for the virtual object (block 4510). Determining the 2D resting plane for the virtual object in block 4510 can include: (a) determining a bounding box for the virtual object; and (b) projecting the bounding box onto the primary plane as the 2D resting plane.

In a number of embodiments, the bounding box, as determined in block 4510, can include one or more box planes parallel to the primary plane and/or one or more second box planes perpendicular to the primary plane. In several embodiments, all of the planes of the bounding box are either parallel or perpendicular to the primary plane. For example, the bounding box (e.g., a bounding box 521 (FIG. 5)) can be cubical and have 2 box planes parallel to the primary plane and 4 second box planes perpendicular to the primary plane (e.g., floor 510 (FIG. 5) and rug 550 (FIG. 5)). For such a cubical bounding box 521 (FIG. 5), the 2D resting plane (e.g., a 2D resting plane 522 (FIG. 5)), projected onto the primary plane (e.g., floor 510 (FIG. 5) and rug 550 (FIG. 5)), is rectangular. Further, in embodiments where the virtual object (e.g., virtual table 520 (FIG. 5), as rendered, is laid on top of the primary plane (e.g., floor 510 (FIG. 5) and rug 550 (FIG. 5)), the 2D resting plane (2D resting plane 522 (FIG. 5)) is identical to the bottom box plane of the bounding box (e.g., bounding box 521 (FIG. 5)).

Now, referring back to FIG. 4, in some embodiments, block 440 further can include determining tracking rays for the virtual object (block 4520). The tracking rays can connect the vertices of the 2D resting plane for the virtual object to a viewpoint from the camera (e.g., camera 3310 (FIG. 3)). In embodiments where the 2D resting plane is rectangular, each of the 4 tracking rays can connect a respective one of the 4 vertices to the viewpoint. In a number of embodiments, block 440 also can include determining the collision based on: (a) whether the tracking rays, as determined in block 4520, intersect with a plane of the existing physical object(s) in the image; and (b) whether the plane comprises a first alignment different than a second alignment of the virtual object (block 4530).

Block 4530 can determine planes of the one or more existing physical objects (e.g., couch 530 (FIG. 3), wall 560 (FIG. 5), etc.) in the image by a 3D plane detection algorithm, model, or module that is similar or different from those used in block 420 for detecting the horizontal planes and vertical planes in the image. In certain embodiments, the planes of the one or more existing physical objects for detecting collisions can be selected from the horizontal planes and vertical planes, as determined in block 420, excluding the primary plane. In a few embodiments, the one or more existing physical objects to be detected can include one or more walls in the real environment. In many embodiments, block 4530 can determine that a collision is likely when any of the tracking rays intersect with a plane of any existing physical objects in the image.

In several embodiments, block 4530 further can include determining whether any plane of the existing physical object(s) (e.g., the plane that at least one tracking ray intersects with) comprises a first alignment different than a second alignment of the virtual object. In certain embodiments, the first alignment of the plane is different than the second alignment of the virtual objection when no edge of the 2D resting plane for the virtual object is parallel to the plane.

Figure 6:
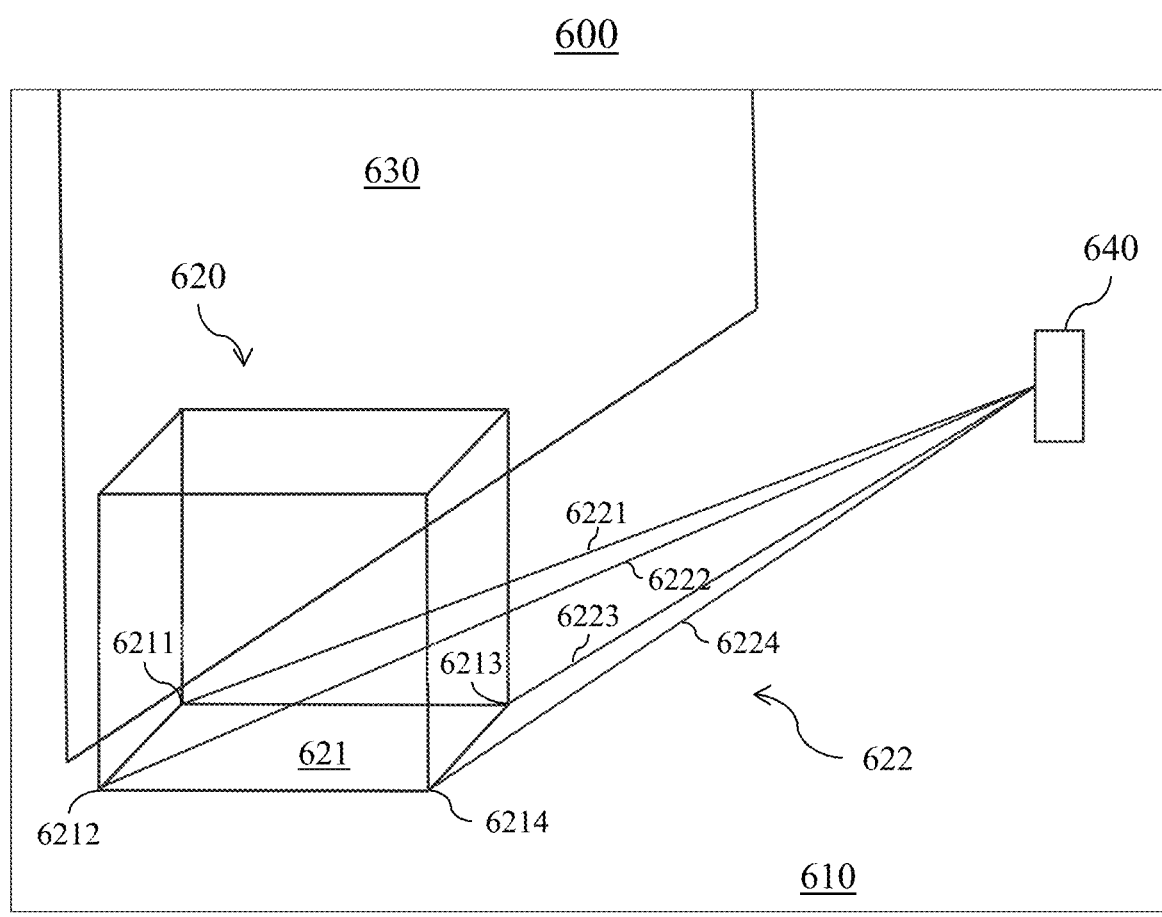
FIGS. 6-7 illustrate a method for detecting a collision with a physical object by a virtual object, according to an embodiment.
Figure 7:
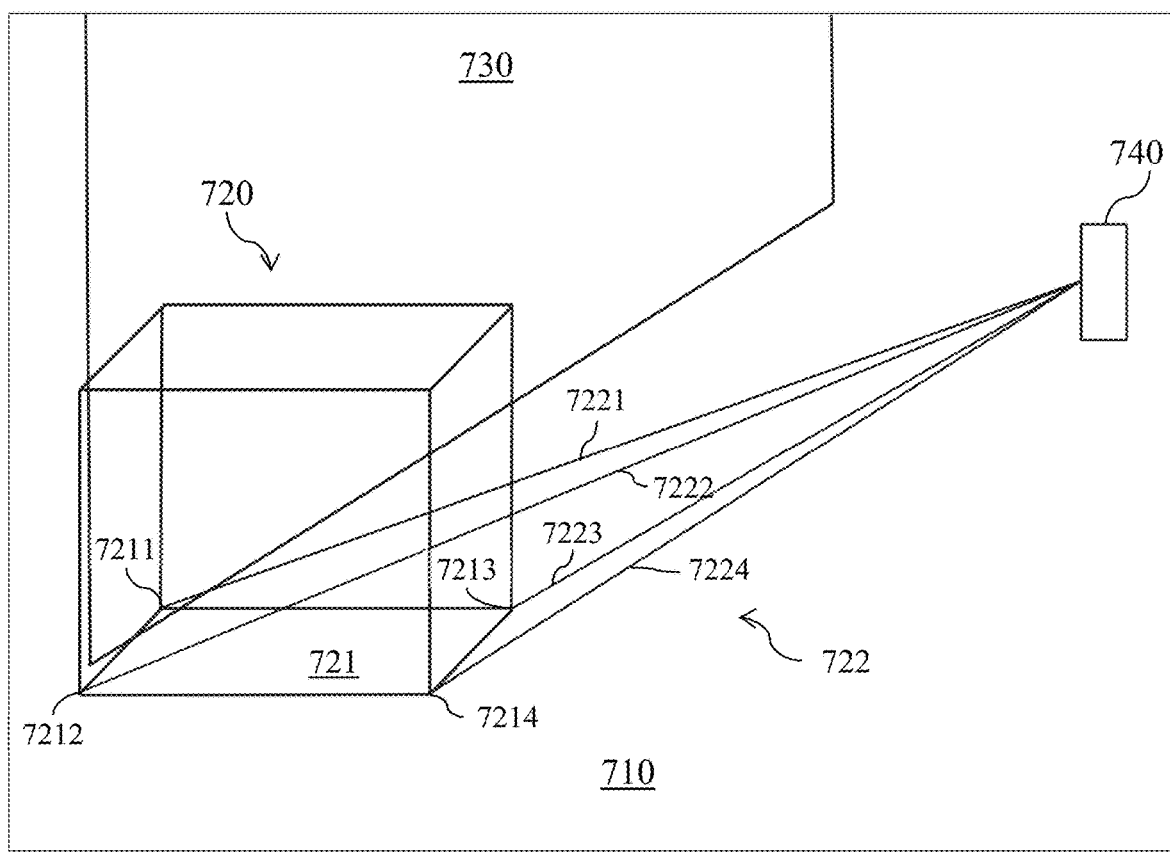

For example, FIGS. 6-7 illustrate a method (e.g., block 450, block 4510, block 4520, and/or block 4530) for detecting a collision with a preexisting physical object (e.g., a wall 630, a wall 730, or wall 560 (FIG. 5)) by a virtual object (e.g., a virtual object 620, a virtual object 720, or virtual table 520 (FIG. 5)) before and after the virtual object is moved in an image of a real environment (e.g., a real environment 600 or 700 respectively), according to an embodiment. The method in FIGS. 6-7 is merely exemplary and is not limited to the embodiments presented herein. To determine the collision between wall 630 or 730 and virtual object 620 or 720, a 2D resting plane (e.g., a 2D resting plane 621, a 2D resting plane 721, or 2D resting plane 521 (FIG. 5)) for virtual object 620 or 720 can be determined by projecting virtual object 620 or 720 onto a primary plane (e.g., a primary plane 610, a primary plane 710, or floor 510 (FIG. 5)) (see, e.g., block 4510). After 2D resting plane 621 or 721 is determined, the tracking rays (e.g., tracking rays 622 (including tracking rays 6221, 6222, 6223, and 6224) or tracking rays 722 (including tracking rays 7221, 7222, 7223, and 7224)) can be determined by connecting the vertices (e.g., vertices 6211, 6212, 6213, and 6214, or vertices 7211, 7212, 7213, and 7214) of 2D resting plane 621 or 721 and a viewpoint (e.g., a viewpoint 640 or a viewpoint 740, respectively) in the image (see, e.g., block 4520).

In many embodiments, after the 2D resting plane and the tracking rays for the virtual object are determined, a collision by the virtual object with any preexisting physical objects in the image can be detected based on the 2D resting plane, the tracking rays, and a plane for the preexisting physical object(s). As shown in FIG. 6, none of tracking rays 622 intersects with any plane of wall 630 in the image. As such, no collision is detected between virtual object 620 and wall 630 (see, e.g., block 4530). As to FIG. 7, there can be a collision between virtual object 720 and wall 730 because: (a) one of tracking rays 722 (e.g., tracking ray 7221) intersects with a plane of wall 730 when vertex 7211 is located at one side of the plane of wall 730 while vertices 7212, 7213, and 7214 are located at the other side of the plane; and (b) a first alignment of the plane of wall 730 is different than a second alignment of virtual object 720 when no edge of 2D resting plane 721 is parallel to the plane of wall 730 (see, e.g., block 4530).

Referring back, again, to FIG. 4, in some embodiments, block 450 further can include determining the collision based on whether the tracking rays extend outside a border of the primary plane (block 4540). The border of the primary plane can be determined in block 420, using a 3D plane detection algorithm, model, or module. A tracking ray can extend outside the border of the primary plane when the vertex of the 2D resting plane corresponding to the tracking ray is located out of the primary plane.

In a number of embodiments, block 450 further can include determining the collision based on whether the 2D resting plane intersects with a second 2D resting plane of the existing virtual object(s) in the image (block 4550). The second 2D resting plane (e.g., a second 2D resting plane 541 (FIG. 5)) of an existing virtual object (e.g., virtual end table 540 (FIG. 5)) can be determined by projecting the existing virtual object onto the primary plane, similar or identical to block 4510. In some embodiments, block 4550 can include determining whether a first edge of the 2D resting plane intersects with a second edge of the second 2D resting plane. Block 4550 can determine that the collision by the virtual object is detected when any edge of the 2D resting plane for the virtual object intersects with any edge of the second 2D resting plane for any preexisting virtual object.

In several embodiments, block 4550 further or alternatively can include: (a) determining a smaller plane of the 2D resting plane and the second 2D resting plane, relative to each other; (b) determining a larger plane of the 2D resting plane and the second 2D resting plane; and (c) determining whether a point of the smaller plane is located inside the larger plane. The smaller plane and the larger plane can be relative between the 2D resting plane for the virtual object and the second 2D resting plane for a preexisting virtual object. Block 4550 can detect the collision by the virtual object by checking the location of every point (e.g., every pixel) of the smaller plane. If any of the points of the smaller plane is located inside the larger plane, block 4550 can determine that the collision by the virtual object is found.

Figure 8:
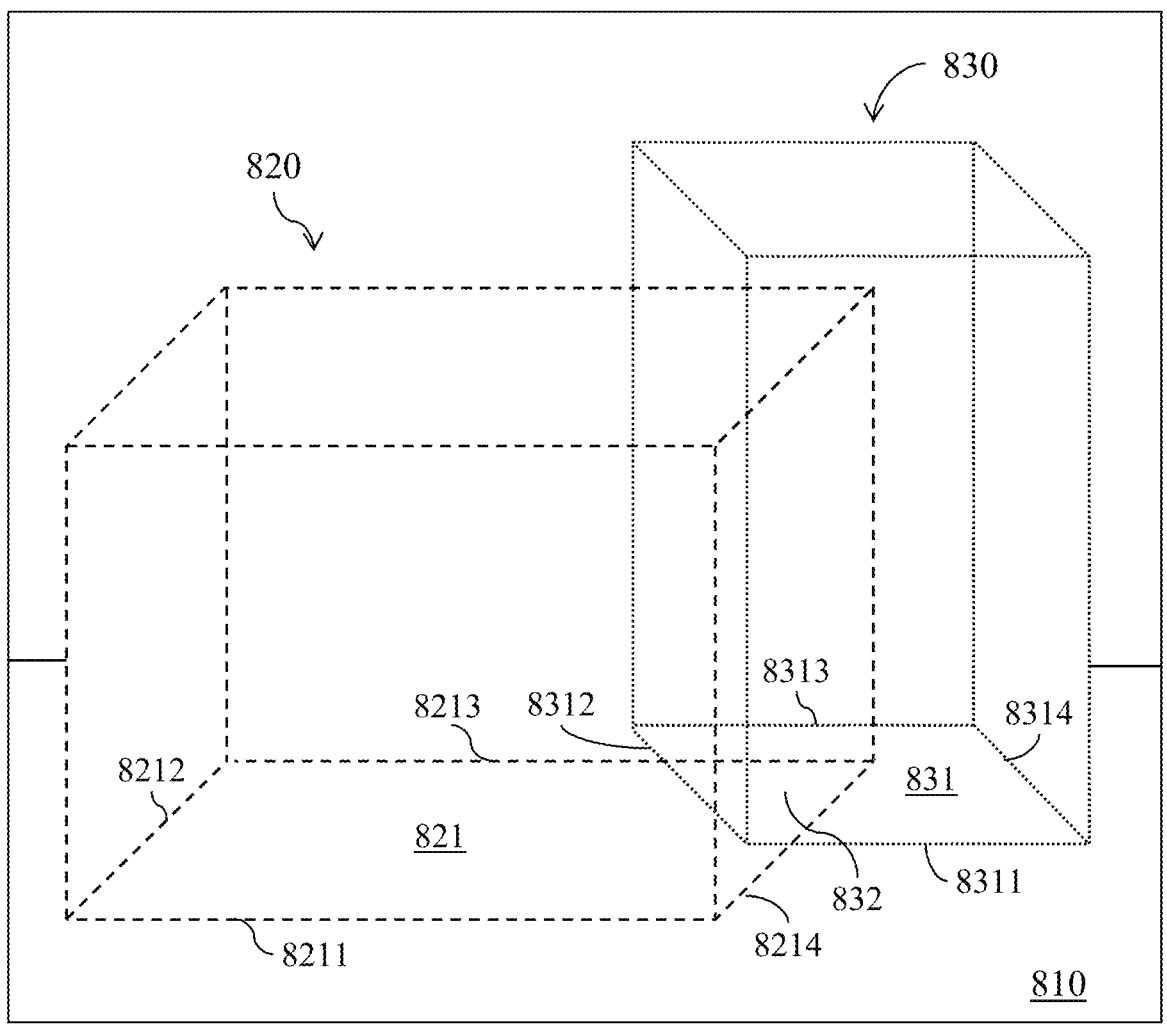
FIG. 8 illustrates a method for detecting collisions between two virtual objects, according to an embodiment.

For example, FIG. 8 illustrates a method (e.g., block 4550) for detecting collisions between two virtual objects (e.g., virtual objects 820 and 830) in an image of a real environment (e.g., a real environment 800), according to an embodiment. The method in FIG. 8 is merely exemplary and is not limited to the embodiments presented herein. In many embodiments, whether a virtual object (e.g., virtual object 820) collides with a preexisting virtual object (e.g., virtual object 830) can be determined based on whether a 2D resting plane (e.g., a 2D resting plane 821) for virtual object 820 intersects with a second 2D resting plane (e.g., a 2D resting plane 831) of virtual object 830 in the image (see, e.g., block 4550). 2D resting plane 821 for virtual object 820 and 2D resting plane 831 for virtual object 830 can be determined by projecting virtual object 820 or 830 respectively onto a primary plane (e.g., a primary plane 810) (see, e.g., block 4510). As shown in FIG. 8, the intersection between 2D resting plane 821 and 2D resting plane 831 can be determined because at least two of the edges of 2D resting plane

821 for virtual object 820 (e.g., edges 8213 and 8214 of edges 8211, 8212, 8213, and 8214) intersect with two of the edges of 2D resting plane 831 for virtual object 830 (e.g., edges 8311 and 8312 of edges 8311, 8312, 8313, and 8314). Further, as shown in FIG. 8, the intersection between 2D resting plane 821 and 2D resting plane 831 can be determined because at least a point (e.g., a pixel 832) in the smaller plane (e.g., 2D resting plane 831) between 2D resting plane 821 and 2D resting plane 831 is located in the larger plane (e.g., 2D resting plane 821). As such, the collision between virtual object 820 and virtual object 830, as shown in FIG. 8, can be detected.

Referring back to FIG. 4, in many embodiments, method 400 further can include outputting a haptic effect (e.g., vibration) indicating the collision, if detected (block 460). Block 460 can use a haptic feedback module (e.g., a haptic feedback module 3320 (FIG. 3) or a vibrator) to output the haptic effect. In some embodiments, as part of block 460 or after block 460, when the collision is detected, method 400 additionally can include cancelling the previous control (e.g., moving or rotating) by the user that causes the collision (e.g., by moving or rotating the virtual object back to the previous 3D location or orientation) or automatically determining the 3D location or orientation of the virtual object based on a predetermined 3D location or orientation or a predefined rule.

In a number of embodiments, one or more of the procedures, the processes, the activities, and/or the blocks (e.g., blocks 410, 420, 430, 440, 450, and/or 460) of method 400 can be performed in real-time and/or repeated continuously. For example, method 400 can repeat block 410 by recapturing, via the camera (e.g., camera 3310 (FIG. 3)), the image of the real environment. Method 400 also can repeat block 440 by determining any changes associated with the virtual object (e.g., virtual table 520 (FIG. 5), virtual object 620 (FIG. 6), virtual object 720 (FIG. 7), virtual object 820 (FIG. 8), etc.) and re-rendering, in real-time on the display device (e.g., a screen of user device 330 (FIG. 3)), the virtual object in the image, as recaptured, based at least in part on at least one of the changes associated with the virtual object. Examples of the changes associated with the virtual object can include a first change in a 3D location of the virtual object in the real environment and/or a second change in an orientation of the virtual object. The first or second change may come from (a) a user command (e.g., dragging or rotating the virtual object) received via a user interface (e.g., AR-based user interface 3330 (FIG. 3)), or (b) a user action associated with the camera (e.g., rotating the camera from portrait mode to landscape mode). Method 400 additionally can repeat block 450 by re-detecting the collision by the virtual object in the image.

Various embodiments can include a system for detecting object collisions in AR images. The system can include one or more processors and one or more non-transitory computer-readable media storing computing instructions that, when executed on the one or more processors, cause the one or more processors to perform various acts. In many embodiments, the acts can include capturing, in real-time via a camera, an image of a real environment. In a number of embodiments, the acts further can include determining, using the image, a primary plane in the real environment. The act of determining, using the image, the primary plane in the real environment further can include: (a) determining horizontal planes and vertical planes in the image of the real environment; (b) determining a default orientation of the virtual object; and (c) determining the primary plane based on the default orientation and a respective size of each of the horizontal planes and the vertical planes. In some embodiments, the acts additionally can include rendering, in real-time on a display device for a user, a virtual object in the image of the real environment. The virtual object can be selected and/or manipulated by a user via a user interface executed on a user device for the user.

In many embodiments, the acts further can include detecting a collision by the virtual object in the image. The act of detecting the collision by the virtual object in the image can include: (a) projecting the virtual object onto the primary plane as a 2D resting plane for the virtual object; (b) determining tracking rays for the virtual object, wherein the tracking rays connect vertices of the 2D resting plane to a viewpoint from the camera; and (c) determining the collision based on whether the tracking rays intersect with a plane of one or more existing physical objects in the image. A collision likely exists when any of the tracking rays intersects with a plane of any of the one or more existing physical objects in the image.

In many embodiments, the act of determining the 2D resting plane for the virtual object can include: (a) determining a bounding box for the virtual object, wherein the bounding box comprises box planes parallel to the primary plane; and (b) projecting the bounding box onto the primary plane as the 2D resting plane. In several embodiments, in addition to the box planes parallel to the primary plane, the bounding box can include second box planes perpendicular to the primary plane. In some embodiments, the bounding box can be cubical, and the 2D resting plane can be rectangular to reduce the mathematical complexity of collision detection.

In a number of embodiments, the act of determining the collision based on whether the tracking rays intersect with the plane of the one or more existing physical objects in the image further can include determining the collision further based on whether the plane comprises a first alignment different than a second alignment of the virtual object. In similar or different embodiments, the collision is detected when the first alignment of the plane is different than the second alignment of the virtual object. In some embodiments, the act of detecting the collision by the virtual object in the image also can include determining the collision further based on whether any of the tracking rays extend outside a border of the primary plane. For example, the border of a primary plane generally is defined by walls and/or physical objects, and therefore, when a tracking ray extends outside the border of the primary plane, the virtual object likely has collided with a wall or an existing physical object.

In some embodiments, the act of detecting the collision by the virtual object further can include determining the collision further based on whether the 2D resting plane intersects with a second 2D resting plane of one or more existing virtual objects in the image. The act of determining the collision further based on whether the 2D resting plane intersect with the second 2D resting plane further can include one or more of: (a) determining whether a first edge of the 2D resting plane intersects with a second edge of the second 2D resting plane; or (b) determining a smaller plane of the 2D resting plane and the second 2D resting plane; determining a larger plane of the 2D resting plane and the second 2D resting plane; and determining whether a point of the smaller plane is located inside the larger plane.

In a number of embodiments, the acts further can include upon determining that the collision is detected, outputting a haptic effect indicating the collision. In many embodiments, the acts further can include additional acts and/or repeating one or more of the abovementioned acts. For example, the acts also can include recapturing, via the camera, the image of the real environment. The acts further can include determining a first change in a 3D location of the real environment or a second change in an orientation of the virtual object. The act of determining the first change in the 3D location of the real environment or the second change in the orientation of the virtual object can include receiving, via the user interface (e.g., AR-based user interface 3330 (FIG. 3)) executed on the user device (e.g., user device 330 (FIG. 3)) or a sensor (e.g., a gyroscope sensor) on the user device, a user command or a user action that can cause the first change in the 3D location of the real environment or the second change in the orientation of the virtual object.

In several embodiments, the acts further can include re-rendering, in real-time on the display device, the virtual object in the image, as recaptured, based at least in part on at least one of the first change or the second change. In many embodiments, the acts also can include re-detecting the collision by the virtual object in the image.

Various embodiments also can include a method for detecting object collisions in AR images. The method can be implemented via execution of computing instructions configured to run at one or more processors and stored at one or more non-transitory computer-readable media. In many embodiments, the method can include one or more of acts described above. For example, the method can include capturing, in real-time via a camera, an image of a real environment. The method additionally can include determining, using the image, a primary plane in the real environment. The method also can include rendering, in real-time on a display device for a user, a virtual object in the image of the real environment. The method further can include detecting a collision by the virtual object in the image.

In many embodiments, detecting the collision by the virtual object in the image can include: (a) projecting the virtual object onto the primary plane as a 2D resting plane for the virtual object; (b) determining tracking rays for the virtual object, wherein the tracking rays connect vertices of the 2D resting plane to a viewpoint from the camera; and (c) determining the collision based on whether the tracking rays intersect with a plane of one or more existing physical objects in the image. In some embodiments, the method further can include upon determining that the collision is detected, outputting a haptic effect indicating the collision.

In many embodiments, the techniques described herein can provide a practical application and several technological improvements. The techniques described herein can provide improvements to the AR technologies, using a simplified and less resource demanding approach to simulate the interactions between virtual objects in a real environment. In particular, using a few tracking rays from a 2D resting plane projected from the boundary box for a 3D virtual object (e.g., 4 tracking rays for a rectangular 2D resting plane) to detect collisions with planes of other preexisting objects merely involves basic geometric formulas and a few number of calculations needed (e.g., 4 intersection detection between the tracking rays and each of respective one or more of plane for each existing object). This approach thus can lower the computing power needed and increase the performance of the real-time image processing system. These techniques described herein can provide a significant improvement over conventional approaches that detect collisions based on whether the outlines of the objects meet or cross each other. Although the conventional approaches can be more accurate and precise, the enormous computing resources used can be wasted, in particularly in applications where a lower accuracy and precision can be acceptable, such as virtually furnishing a space for on-line shopping, showing virtual characters for AR video games, or teaching kids geometry on an e-learning platform.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although detecting collisions by a virtual object in an AR image of a real environment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-8 may be modified, and that the foregoing discussion of certain of these embodiments does not necessarily represent a complete description of all possible embodiments. Different formulas, functions, parameters, and/or machine learning algorithms may be used to determine the planes of preexisting objects (e.g., the primary plane), detect intersections between the tracking rays and/or the 2D resting plane and the planes of the preexisting objects, and so forth.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
   one or more processors; and
   one or more non-transitory computer-readable media storing computing instructions that, when run on the one or more processors, cause the one or more processors to perform:
   capturing, in real-time via a camera, an image of a real environment;
   determining, using the image, a primary plane in the real environment;
   rendering, in real-time on a display device for a user, a virtual object in the image of the real environment;
   detecting a collision by the virtual object in the image, comprising:
   projecting the virtual object onto the primary plane as a 2D resting plane for the virtual object;
   determining tracking rays for the virtual object, wherein the tracking rays connect vertices of the 2D resting plane to a viewpoint from the camera; and determining the collision based on whether the tracking rays intersect with a plane of one or more existing physical objects in the image; and upon determining that the collision is detected, outputting a haptic effect indicating the collision.

2. The system in claim 1, wherein determining, using the image, the primary plane in the real environment further comprises:
determining horizontal planes and vertical planes in the image of the real environment;
determining a default orientation of the virtual object; and
determining the primary plane based on the default orientation and a respective size of each of the horizontal planes and the vertical planes.

3. The system in claim 1, wherein detecting the collision by the virtual object in the image further comprises:
determining the 2D resting plane for the virtual object, comprising:
determining a bounding box for the virtual object, wherein the bounding box comprises box planes parallel to the primary plane; and
projecting the bounding box onto the primary plane as the 2D resting plane.

4. The system in claim 3, wherein:
the bounding box further comprises second box planes perpendicular to the primary plane.

5. The system in claim 4, wherein:
the bounding box is cubical; and
the 2D resting plane is rectangular.

6. The system in claim 1, wherein determining the collision based on whether the tracking rays intersect with the plane of the one or more existing physical objects in the image further comprises:
determining the collision further based on whether the plane comprises a first alignment different than a second alignment of the virtual object.

7. The system in claim 1, wherein detecting the collision by the virtual object in the image further comprises:
determining the collision further based on whether the tracking rays extend outside a border of the primary plane.

8. The system in claim 1, wherein detecting the collision by the virtual object in the image further comprises:
determining the collision further based on whether the 2D resting plane intersects with a second 2D resting plane of one or more existing virtual objects in the image.

9. The system in claim 8, wherein determining the collision further based on whether the 2D resting plane intersect with the second 2D resting plane further comprises one or more of:
(a) determining whether a first edge of the 2D resting plane intersects with a second edge of the second 2D resting plane; or
(b) determining a smaller plane of the 2D resting plane and the second 2D resting plane;
determining a larger plane of the 2D resting plane and the second 2D resting plane; and
determining whether a point of the smaller plane is located inside the larger plane.

10. The system in claim 1, wherein the computing instructions, when run on the one or more processors, further cause the one or more processors to perform:
recapturing, via the camera, the image of the real environment;
determining a first change in a 3D location of the real environment or a second change in an orientation of the virtual object;
re-rendering, in real-time on the display device, the virtual object in the image, as recaptured, based at least in part on at least one of the first change or the second change; and
re-detecting the collision by the virtual object in the image.

11. A method being implemented via execution of computing instructions configured to run at one or more processors and stored at one or more non-transitory computer-readable media, the method comprising: capturing, in real-time via a camera, an image of a real environment;
determining, using the image, a primary plane in the real environment;
rendering, in real-time on a display device for a user, a virtual object in the image of the real environment;
detecting a collision by the virtual object in the image, comprising:
projecting the virtual object onto the primary plane as a 2D resting plane for the virtual object;
determining tracking rays for the virtual object, wherein the tracking rays connect vertices of the 2D resting plane to a viewpoint from the camera; and
determining the collision based on whether the tracking rays intersect with a plane of one or more existing physical objects in the image; and
upon determining that the collision is detected, outputting a haptic effect indicating the collision.

12. The method in claim 11, wherein determining, using the image, the primary plane in the real environment further comprises:
determining horizontal planes and vertical planes in the image of the real environment;
determining a default orientation of the virtual object; and
determining the primary plane based on the default orientation and a respective size of each of the horizontal planes and the vertical planes.

13. The method in claim 11, wherein detecting the collision by the virtual object in the image further comprises:
determining the 2D resting plane for the virtual object comprising:
determining a bounding box for the virtual object, wherein the bounding box comprises box planes parallel to the primary plane; and
projecting the bounding box onto the primary plane as the 2D resting plane.

14. The method in claim 13, wherein:
the bounding box further comprises second box planes perpendicular to the primary plane.

15. The method in claim 14, wherein:
the bounding box is cubical; and
the 2D resting plane is rectangular.

16. The method in claim 11, wherein determining the collision based on whether the tracking rays intersect with the plane of the one or more existing physical objects in the image further comprises:
determining the collision further based on whether the plane comprises a first alignment different than a second alignment of the virtual object.

17. The method in claim 11, wherein detecting the collision by the virtual object in the image further comprises:
determining the collision further based on whether the tracking rays extend outside a border of the primary plane.

18. The method in claim 11, wherein detecting the collision by the virtual object in the image further comprises:

determining the collision further based on whether the 2D resting plane intersect with a second 2D resting plane of one or more existing virtual objects in the image.

19. The method in claim 18, wherein determining the collision further based on whether the 2D resting plane intersect with the second 2D resting plane further comprises one or more of:
   (a) determining whether a first edge of the 2D resting plane intersects with a second edge of the second 2D resting plane; or
   (b) determining a smaller plane of the 2D resting plane and the second 2D resting plane;
       determining a larger plane of the 2D resting plane and the second 2D resting plane; and
       determining whether a point of the smaller plane is located inside the larger plane.

20. The method in claim 11, further comprising:
   recapturing, via the camera, the image of the real environment;
   determining a first change in a 3D location of the real environment or a second change in an orientation of the virtual object;
   re-rendering, in real-time on the display device, the virtual object in the image, as recaptured, based at least in part on at least one of the first change or the second change; and
   re-detecting the collision by the virtual object in the image.

* * * * *